United States Patent
Shiao

(10) Patent No.: US 11,638,429 B2
(45) Date of Patent: May 2, 2023

(54) HYPOCHLOROUS ACID DISINFECTANT AND ITS PRODUCTION METHOD

(71) Applicants: Wen Chung Shiao, Taipei (TW); SUPER AQUA INTERNATIONAL CO., LTD., Taipei (TW)

(72) Inventor: Wen Chung Shiao, Taipei (TW)

(73) Assignee: SUPER AQUA INTERNATIONAL CO., LTD., Taipei (TW)

( * ) Notice: Subject to any disclaimer, the term of this patent is extended or adjusted under 35 U.S.C. 154(b) by 0 days.

(21) Appl. No.: 16/892,652

(22) Filed: Jun. 4, 2020

(65) Prior Publication Data

US 2021/0267210 A1    Sep. 2, 2021

(30) Foreign Application Priority Data

Feb. 27, 2020  (TW) .................. 109106362

(51) Int. Cl.
*A01N 25/34*  (2006.01)
*A01N 59/00*  (2006.01)

(52) U.S. Cl.
CPC ............. *A01N 59/00* (2013.01); *A01N 25/34* (2013.01)

(58) Field of Classification Search
CPC ........ A01N 59/00; A01N 25/34; A01N 43/64; A01N 25/12; C01B 11/04; C02F 2103/32; C02F 2103/42; C02F 2303/02; C02F 2303/04; C02F 1/76; A01P 1/00
See application file for complete search history.

(56) References Cited

U.S. PATENT DOCUMENTS

| | | | |
|---|---|---|---|
| 4,025,628 | A | 5/1977 | Dewey et al. |
| 5,711,211 | A | 1/1998 | Ide et al. |
| 7,651,628 | B2 | 1/2010 | Morioka et al. |

(Continued)

FOREIGN PATENT DOCUMENTS

| | | |
|---|---|---|
| CA | 2028930 A1 | 5/1992 |
| CN | 1341145 A | 3/2002 |

(Continued)

OTHER PUBLICATIONS

Google translation of CN103300063A 2013; 7 pages. (Year: 2013).*

(Continued)

*Primary Examiner* — Ernst V Arnold
(74) *Attorney, Agent, or Firm* — Muncy, Geissler, Olds & Lowe, P.C.

(57) ABSTRACT

A novel hypochlorous acid disinfectant and its production method. The disinfectant is prepared by weight in a total of 100% as chlorine powder (dichloroisocyanuric acid, sodium salt or trichloroisocyanuric acid) of 20 to 45%, adding sodium dihydrogen phosphate or citric acid, or ingredients or raw materials with acidic pH of 15 to 40% as a main ingredient, calcium chloride of 15 to 20%, excipients of 3 to 8%. The method includes: stirring the chlorine powder with the calcium chloride; adding the sodium dihydrogen phosphate, the citric acid, the ingredients, or raw materials with acidic pH in order; and adding the excipient while stirring for 20 to 30 minutes until completely uniform to prepare the hypochlorous acid disinfectant. This disinfectant is quantitatively accurate, does not need to calculate the ratio, and is convenient to use and safe to transport.

10 Claims, 4 Drawing Sheets

(56) References Cited

U.S. PATENT DOCUMENTS

| | | | |
|---|---|---|---|
| 9,414,584 B2 * | 8/2016 | Panicheva | A61K 33/10 |
| 2012/0237616 A1 | 9/2012 | Panicheva et al. | |
| 2014/0272039 A1 | 9/2014 | Mckedy | |
| 2017/0112872 A1 * | 4/2017 | Lange | A61K 8/673 |

FOREIGN PATENT DOCUMENTS

| | | | | |
|---|---|---|---|---|
| CN | 1555696 A | | 12/2004 | |
| CN | 101124169 A | | 2/2008 | |
| CN | 101142916 A | | 3/2008 | |
| CN | 01233851 B | | 6/2010 | |
| CN | 103300063 A | * | 9/2013 | |
| CN | 103875677 A | | 6/2014 | |
| CN | 106957070 A | | 7/2017 | |
| CN | 108174855 A | | 6/2018 | |
| CN | 110012904 A | | 7/2019 | |
| CN | 110012904 A | | 7/2019 | |
| CN | 110150315 A | * | 8/2019 | A01N 59/00 |
| CN | 110402925 A | | 11/2019 | |
| EA | 007951 B1 | | 2/2007 | |
| EP | 3815532 A1 | | 5/2021 | |
| IT | FI20080175 A1 | | 3/2010 | |
| JP | 3-258392 A | | 11/1991 | |
| JP | 5-237478 A | | 9/1993 | |
| JP | 2627101 B2 | | 7/1997 | |
| JP | 3085356 U | | 4/2002 | |
| JP | 2005-349382 A | | 12/2005 | |
| JP | 2014-148526 A | | 8/2014 | |
| KR | 10-2018-0073897 A | | 7/2018 | |
| TW | 200833378 A | | 8/2008 | |
| WO | WO-00/51434 A1 | | 9/2008 | |
| WO | WO 2019/236753 A1 | | 12/2019 | |

OTHER PUBLICATIONS

Google translation of CN 110150315A 2019; 12 pages (Year: 2019).*

Bajaj et al. (Journal of Applied Pharmaceutical Science 2012;02(03):129-138). (Year: 2012).*

Norihito et al. "Technology of Water Purification", published by the Japan Gakuindo, 1985, p. 104 (4 pages total), with an English translation.

Norihito et al., "Technology of Wafer Purification", published by the Japan Gakuindo, 1985, p. 102 (4 pages total), with an English translation.

European Search Report dated Dec. 16, 2021 from related Application No. 21159786.9,14 pages (SUP1-PAU01EP).

* cited by examiner

HYPOCHLOROUS ACID DISINFECTANT AND ITS PRODUCTION METHOD

This application claims priority for Taiwan patent application no. 109106362 filed on 27 Feb. 2020, the content of which is incorporated by reference in its entirely.

BACKGROUND OF THE INVENTION

Field of the Invention

The novel invention relates to a related field of a disinfectant, which can be made into a novel hypochlorous acid disinfectant, a novel hypochlorous acid tablet disinfectant, and its production.

Description of the Prior Art

Chlorine-containing disinfectants such as sodium hypochlorite and calcium hypochlorite have been used for disinfection and sterilization for more than 100 years. Because it is easy to obtain for production, low in price, easy to use and has an accurate sterilization effect, it is the most commonly used sterilant in the current disinfection drug market, which is not only economical, but also can kill more than 90% of bacteria in a few minutes at normal temperature and neutral pH. The mechanism of its bactericidal action is the formation of hypochlorous acid in water, which can interact with the cell wall of bacteria, and invade the cells and oxidize with proteins or destroy the cell walls due to small molecule and being uncharged, thereby causing metabolic disorders and bacterial death. However, many studies have shown that the use of chlorine-based drugs in water is prone to produce chloroform, chlorine compounds and the like with organic substances, and hence has the problem of carcinogenesis, liver poisoning and kidney poisoning.

Further, chlorine-containing disinfectants have many disadvantages, such as corrosive to human skin mucous, unfriendly environment, and easy to rust the equipment; in addition, having strong irritating smell at high concentrations. It is reported that chlorine- and bromine-containing preparations have caused environmental pollution, which has attracted more and more attention Therefore, finding a disinfectant with good sterilizing properties without chemical residues has become a concern of government sectors and scientists.

For the percentage relationship between hypochlorous acid and pH value, please refer to FIG. 1, *"Technology of Water Purification"*, co-authored by Tanbo Norihito and Ogasawara Hongichi, published by the Japan Gakuindo (1985). For the percentage of hypochlorous acid and pH value, please refer to the following instructions.

It is known to the public that in order to produce hypochlorous acid components, in Japan table salt (sodium chloride) is added to water, and electrolysis is performed through a diaphragm to generate; in anodic acid-forming water, a hypochlorous acid component (hypochlorous acid of 10-50 ppm with pH 2.5) is found; although hypochlorous acid is low concentration, it has a strong bactericidal effect. (Referring to Japan publication of patent application No. H03-258392).

Thereafter, some Japanese companies used hydrochloric acid and water for electrolysis to produce slightly acidic hypochlorous water (hypochlorous acid of 10 to 30 ppm with pH 5 to 6.5); around 1990, Tatsuo Okazaki of OMC (Okazaki Manufacture Company) Japan used patented electrolytic equipment (Patent Publication 1993 No. 5~237478) to make a patented electrolyte by a fixed proportion of hydrochloric acid and table salt (sodium chloride) (Japan patent application No. 249755) and used non-diaphragm electrolysis to generate hypochlorous acid water which is named "Super Micro-softened Acidified Water" with a pH value of 4 to 7.0 and a concentration of hypochlorous acid of 50 to 80 ppm. After the invention was launched on the market, it was introduced by major Japanese beer and beverage companies, dental clinics of the National Hospital, etc., opening a novel era of the hypochlorous acid application.

In 1998, Tatsuo Okazaki again invented a novel technology, in which a mixing machine of sodium hypochlorite and hydrochloric acid solution is used to produce hypochlorous acid sterilizing water with a high concentration of 50 ppm to 200 ppm. This technology eliminates the need to use electrolysis to produce high-concentration hypochlorous acid sterilizing water. Japan O Company also improved the storage structure of the sodium hypochlorite tank and the hydrochloric acid tank used by the above machine to apply for an improved patent. Please refers to Japanese Utility Model Registration No. 3085356 in 2002.

In 2006, Tatsuo Okazaki et al. reinvented a novel technology, i.e., a machine that uses sodium hypochlorite solution or sodium chlorite solution, and mix with carbonated gas to produce hypochlorous acid sterilizing water. it has a patent registered in Japan and China (Japanese Patent Application No. 2005~349382, China Publication No. CN101124169A). In this technology, dissolved carbon dioxide gas is used to produce carbonated water with an acidic pH, which is added to an aqueous solution of sodium hypochlorite or an aqueous solution of sodium chlorite to produce the hypochlorous acid sterilizing water having a pH value of 4.0 to 6.5, a slightly acidic.—The claims include adding an acid other than carbonic acid to sodium hypochlorite aqueous solution or sodium chlorite aqueous solution (note: please refer to claim 5 of the Chinese patent) to generate hypochlorous acid sterilizing water. This technology mixes sodium hypochlorite with basic pH and water with an acidic carbonated gas to generate hypochlorous acid with a stable pH of 4.0 to 6.5, wherein the hypochlorous acid has a concentration of 50 ppm, 100 ppm, 200 ppm etc. (note: adjustable). The hypochlorous acid is slightly acidic with a pH of about 4.0 to 6.5 and has high stability. It can be used in various industries for sterilization, shorten sterilization time, be safe for people, and be friendly to the environment.

After the prior novel technology of hypochlorous acid is developed, the generated hypochlorous acid thereby has a concentration that is higher than the same produced by the electrolytic principle, and has a stronger sterilization. It has been widely used in Japan's major beer, beverage factories, food, restaurants, hotels, or national hospitals, dental clinics, aquaculture, livestock industry, aquatic industry, etc., and has been used in various industries for many years. Uni-President, King Car Group, Kinmen Kaoliang Liquor Inc., 7-11 and McDonald's Large Cut Vegetable Factories in Taiwan have used this technology for many years.

Chlorine compounds are the most commonly used fungicides, the reaction in water is the same as that of liquid chlorine and sodium hypochlorite solution (commonly known as bleach water); the conversion of chlorine content is expressed as "effective chlorine". and then chlorine (powder) is added to water to produce a chemical reaction, wherein the main dissociation produces hypochlorous acid (HCLO), hypochlorite ion (CLO—) and chloride ion (CL—). The chloride ion is the same as the main component of chloride ion in seawater, which have no sterilization effect. Hypochlorous acid (HCLO) and hypochlorite ion (CLO—) have a sterilization effect and are called "effective free chlorine".

However, hypochlorous acid (HCLO) and hypochlorite ion (CLO—) will vary greatly with changes in pH. Chlorine powder or sodium hypochlorite solution dissolved in water will generate hypochlorous acid (HCLO) and hypochlorite ion (CLO—). Although hypochlorous acid (HCLO) and hypochlorite ion (CLO—) are both effective free chlorines, the sterilization of hypochlorous acid (HCLO) is 80 times that of hypochlorite ion (CLO—). (See FIG. 2, U.S. EPA, partially added, "Water Purification Technology" published in Japan)

Since the chlorine powder or sodium hypochlorite solution has a pH that is alkaline after being dissolved in water, the hypochlorous acid group ion (CLO—) with weak sterilization dominates though some of the components are dissociated into the hypochlorous acid (HCLO) with strong sterilization. (See FIG. 1) In order to produce 100% hypochlorous acid with stable and powerful sterilization ingredients, as shown in FIG. 1, hypochlorous acid and hypochlorous acid group ions are 100% and stable hypochlorous acid when the pH is 4~6.5, which is the main theoretical basis of the present invention.

The patent application of this novel invention is to apply for a novel chlorine powder (dichloroisocyanuric acid, sodium salt or trichloroisocyanuric acid), which is more stable and after than conventional novel chlorine powder because the composition containing chlorine compounds has been stabilized and treated, the chlorine powder ingredient is more stable and safer than traditional chlorine powder. The novel type of chlorine powder (dichloroisocyanuric acid, sodium salt, or trichloroisocyanuric acid) is added to water to dissociate the components of the chlorine compounds contained in it to produce hypochlorous acid (HCLO) and hypochlorous acid group ion (CLO—), which are alkaline in pH; in addition, the calculated proportion of sodium dihydrogen phosphate (inorganic acid) or citric acid (organic acid) or pH acidic components or raw materials is used to make the novel hypochlorous acid agent dissolved in water, so that a stable hypochlorous acid with high concentration is produced in slightly acidic water with pH value of 4 to 6.5 The hypochlorous acid product of this novel invention patent has strong sterilization effects and can conduct quick and powerful sterilization. It is safe for people, and friendly to the environment while being widely used in the disinfection and sterilization of various industries in the future. This novel type of hypochlorous acid agent will also gradually replace the traditionally-used chlorine powder or chlorine gas, or the traditional disinfectants such as sodium hypochlorite solution or calcium hypochlorite. It will be more widely used in various industries for disinfection and sterilization, and provide safer, more effective and more environmentally friendly sterilization method, which will benefit national health and environmental welfare.

The development of the novel hypochlorous acid agent of this application does not require the traditional use of electrolytic equipment to produce hypochlorous acid, and there is no need to plastic bucket (tank) to transport sodium hypochlorite solution, which greatly saves transportation costs or the use of plastic bucket containers. Users can add tap water or purified water into the product at anytime, anywhere, to produce hypochlorous acid with a concentration of 100 ppm, 200 ppm or higher for necessary disinfection or sterilization of vegetables and fruits, or for removing mildew or odor from the environment, bleaching, cleaning and sterilization of kitchen and bathroom, or for disinfection and demand of various industries.

SUMMARY OF THE INVENTION

Based on the above reasons, the novel hypochlorous acid disinfectant and its production method of the present invention are a novel hypochlorous acid agent (powder) and hypochlorous acid tablet disinfectant and its production method, which may effectively solve the inconvenience of using general disinfectants, and the inconvenience that traditionally use electrolytic equipment or machine mixing equipment using chemicals to produce hypochlorous acid sterilizing water.

To achieve the above purpose, this invention presents a novel hypochlorous acid disinfectant, using a method based on weight percentage, centering on the presence and stability of hypochlorous acid at a pH of about 4 to 6.5, to develop a hypochlorous acid with safety, convenience and high concentration. The present invention is calculated by weight percentage: with a novel chlorine powder (Dichloroisocyanuric acid, sodium salt or Trichloroisocyanuric acid) of 20 to 45%, adding sodium dihydrogen phosphate or citric acid, or ingredients or raw materials with acidic pH of 15 to 40% as a main ingredient, calcium chloride of 15 to 20%, and excipients of 3 to 8%, the total amount is 100%. The production method is to mix the novel chlorine powder with the calcium chloride, then add sodium dihydrogen phosphate or citric acid or ingredients, or raw materials with acidic pH in turn, and then add the excipient, and after stirring well for about 20 to 30 minutes, the novel hypochlorous acid disinfectant in this application case will be made.

Further, the same main ingredients as the above: a novel chlorine powder (dichloroisocyanuric acid, sodium salt or trichloroisocyanuric acid) of 20 to 45%, adding sodium dihydrogen phosphate or citric acid, or ingredients or raw materials with acidic pH of 15 to 40% as a main component, and calcium chloride of 15 to 20%, adding sodium bicarbonate of 5% to 10%, and excipients of 5 to 10%, and after well stirring for about 20 to 30 minutes, the hypochlorous acid agent of the present invention will be made; and these may be made into tablets by a tableting press to prepare hypochlorous acid tablets. The hypochlorite tablets of the present invention may be increased or decreased in raw material and percentage according to the concentration of hypochlorous acid on demand, and the properties of slow or instant dissolution.

The a novel hypochlorous acid agent (tablet) disinfectant of the present invention, which is precisely measured and does not require calculation or another proportion, and can directly added to tap water or purified water according to the proportion of mixed water, so that it is convenient to use and can be wisely used without the use of bucket and tank transportation.

The technical features and advantages of the disclosure have been outlined quite extensively above, so that the detailed description of the disclosure below may be better understood. Other technical features and advantages that constitute the claims of the disclosure will be described below. Those with ordinary knowledge in the technical filed of this disclosure should understand that the concepts and specific embodiments disclosed below can be used quite easily to modify or design other structures or processes to achieve the same purpose as the disclosure. Those with ordinary knowledge in the field of technology to which this disclosure belongs should also understand that such equiva-

DESCRIPTION OF THE PREFERRED EMBODIMENTS

The following describes the specific embodiments of the present invention in detail in combination with specific situations:

This application presents a novel disinfection product through the scientific configuration of its components, maximizing the superiority of its properties and other components.

Embodiment 1, an Example is Described as Below

The novel hypochlorous acid disinfectant of the invention is calculated by weight percentage, in a total of 100%, a novel chlorine powder (dichloroisocyanuric acid, sodium salt or trichloroisocyanuric acid) of 50%, adding sodium dihydrogen phosphate, or citric acid or ingredients or raw materials with acidic of 35% as a main ingredient, calcium chloride of 15%, and excipient of 10%. The production method thereof is to mix the novel chlorine powder with the calcium chloride, then add the sodium dihydrogen phosphate or the citric acid, or ingredients or raw materials with acidic pH in turn, and then add the excipient, and after stirring well for about 20 to 30 minutes, novel hypochlorous acid disinfectant in this application case will be made.

Embodiment 2, an Example is Described as Below

The novel a novel hypochlorous acid disinfectant of the present invention, with the same ingredients as the above, is prepared by weight in a total of 100%, a novel chlorine powder (dichloroisocyanuric acid, sodium salt or trichloroisocyanuric acid) of 33%, adding sodium dihydrogen phosphate or citric acid, or ingredients or raw materials with acidic pH of 26% as a main ingredient, and calcium chloride of 12%, and adding sodium bicarbonate of 17% and excipients of 12% while stirring. After well stirring for about 20 to 30 minutes, the hypochlorous acid disinfectant of the present invention is made after being tableted by a tableting press. The tablets of the present invention may be increased or decreased in raw material and percentage according to the concentration of hypochlorous acid on demand, and the properties of slow or instant dissolution.

Figure 1:
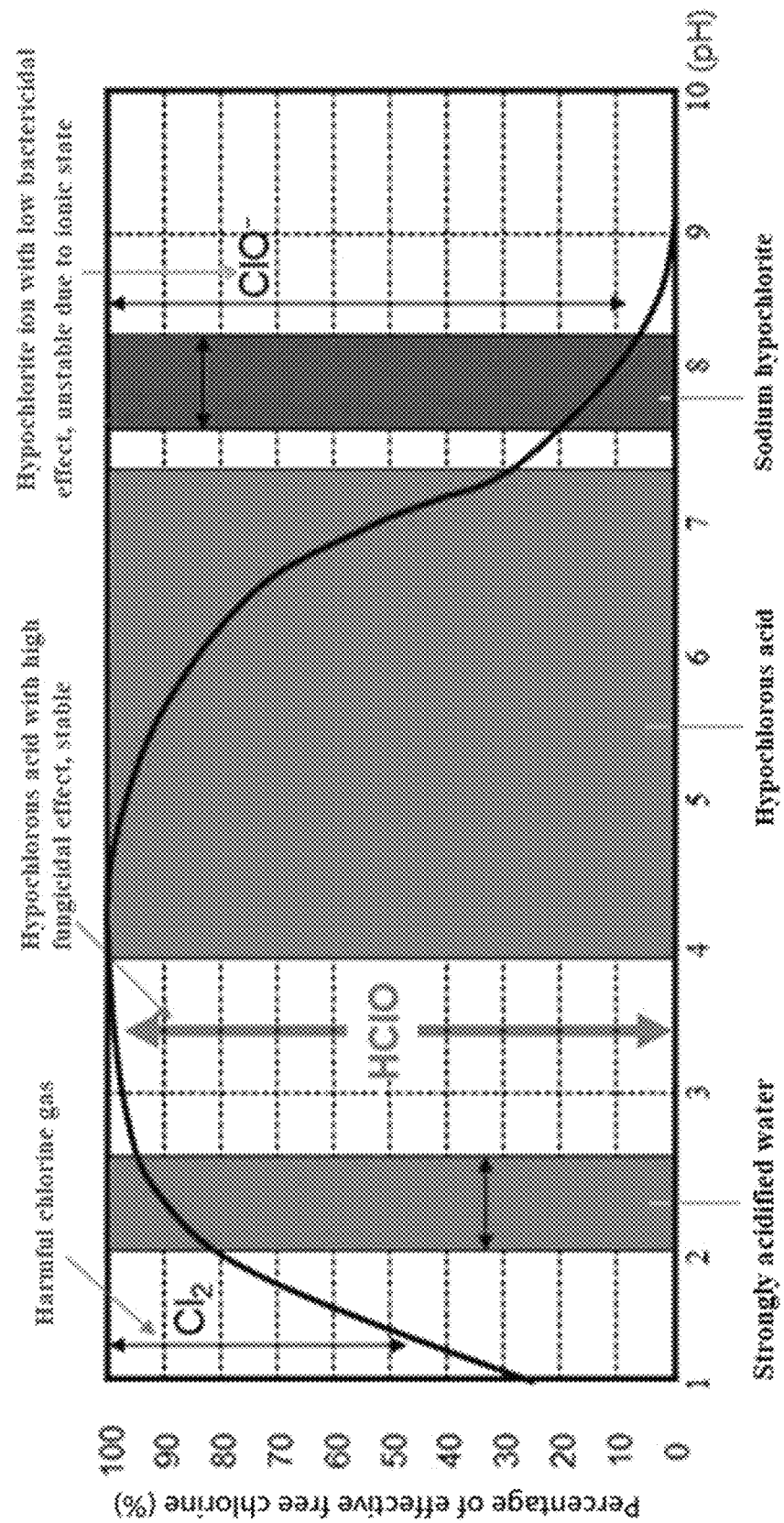
FIG. 1 shows the relationship between the percentage of hypochlorous acid and pH.
Figure 2:
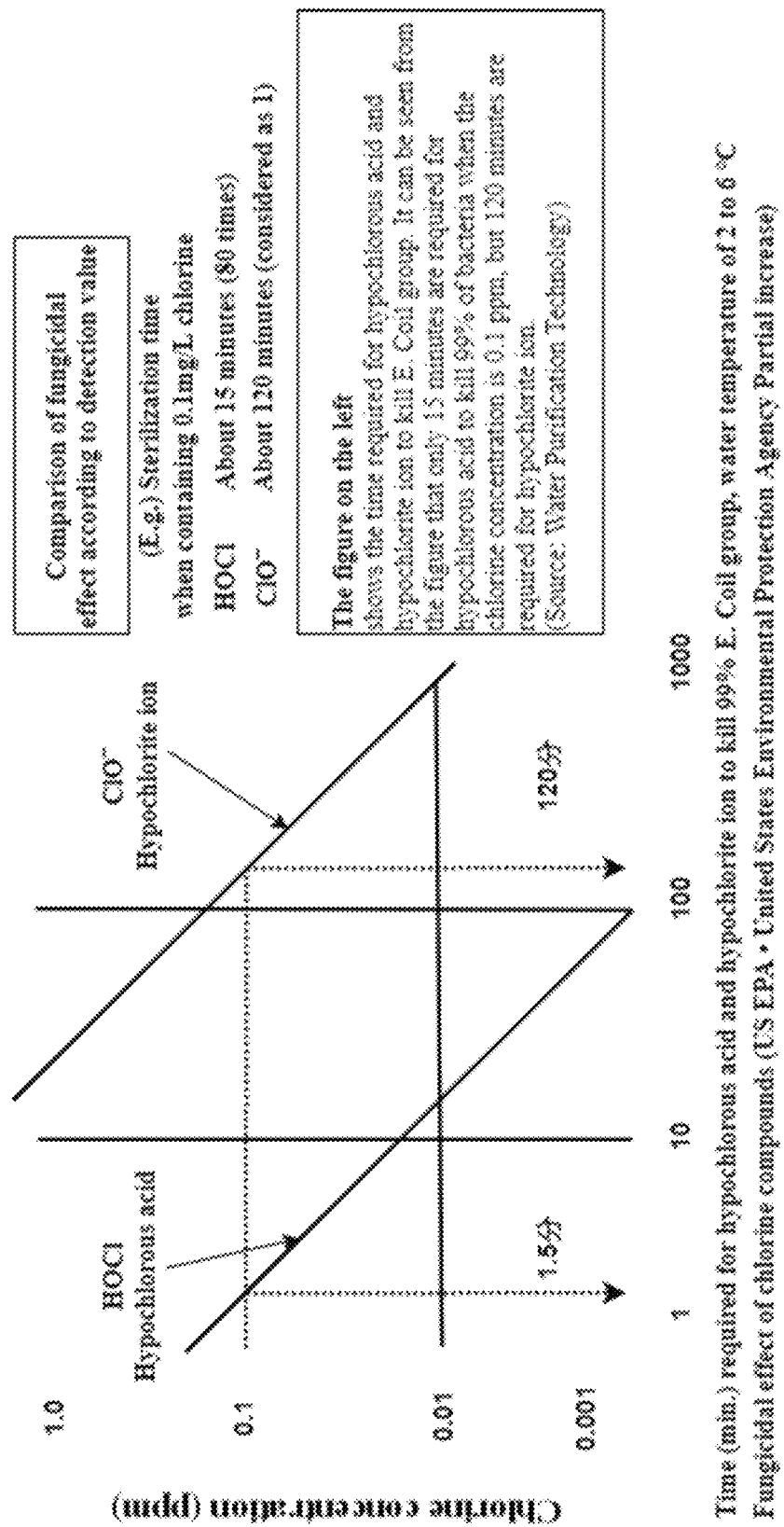
FIG. 2 shows the time required for hypochlorous acid and hypochlorous group ion to kill coliform. The bactericidal power of chlorine compounds (see U.S. EPA, partially added)
Figure 3:
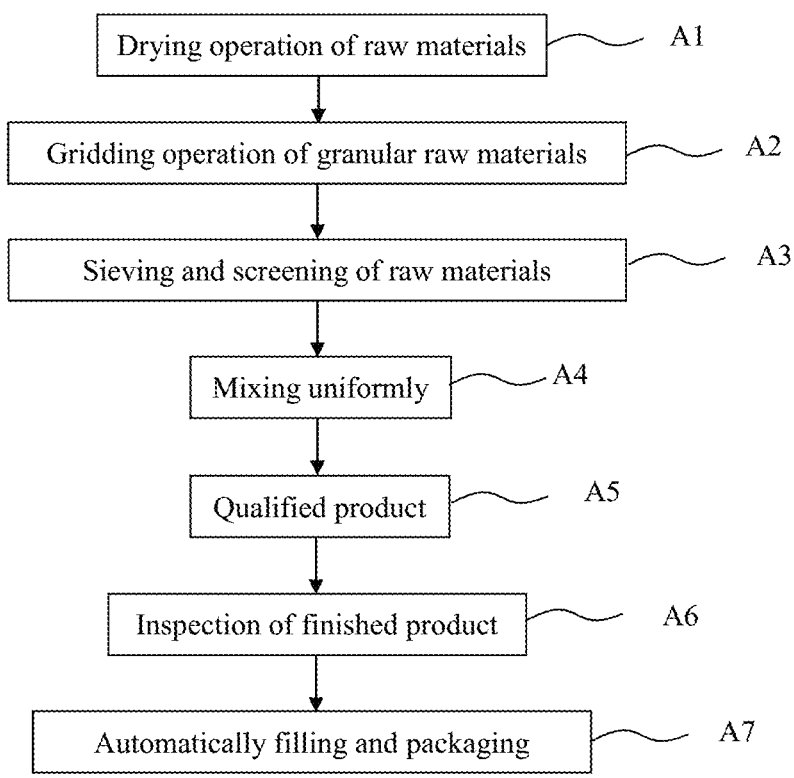
FIG. 3 shows a flow chart of a production method for the novel hypochlorous acid agent according to the present invention; and, FIG. 4 shows a flow chart of a production method for the novel hypochlorous acid disinfectant according to the present invention.
Figure 4:
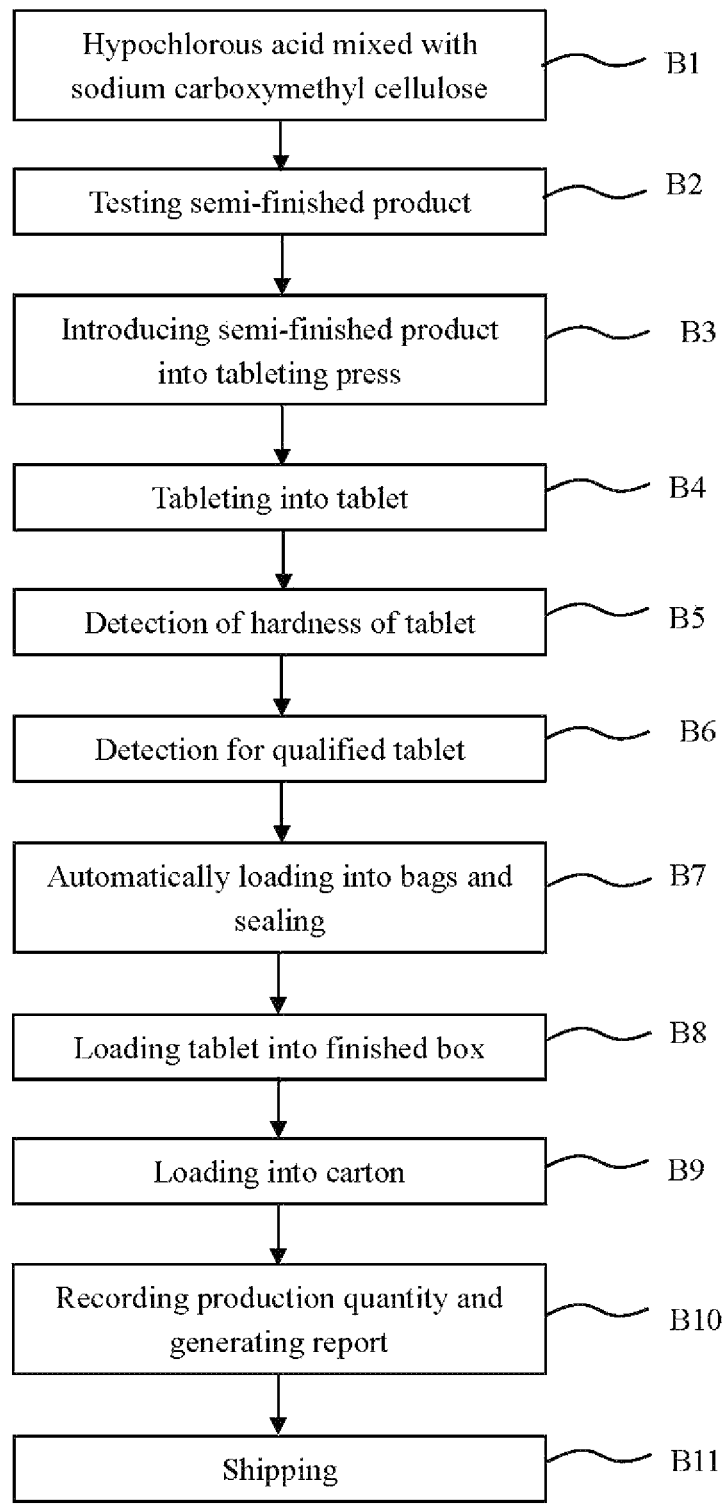

For detailed production methods, please refer to the flowcharts in FIGS. 3 and 4. The standards and requirements for the production process of the disclosure are as follows.

For the raw materials, each raw material supplier is requested to provide an analysis table of the raw material composition and a material safety data sheet to confirm that each raw material complies with laws and regulations.

The basic conditions and specifications of the production room include: (1) the raw materials must be dried at 40 to 50 degrees, or choose anhydrous raw materials; (2) The granular raw materials should be ground to ensure that the raw materials can be mixed uniformly; (3) the filling room should be kept at a temperature of 18 to 25 degrees and a relative humidity: 20% to 25% law humidity of production workshop; (4) the production line must meet the specifications of GMP or related operations.

For packaging materials, the hypochlorous acid agent (tablet) should be sealed in an opaque waterproof aluminum foil bag or a moisture-proof bag; this hypochlorous acid agent (tablet) should be sealed in an opaque aluminum foil bag, and the hypochlorous acid agent (tablet) can be sealed with an outer box and film.

For the quality control standards, a pH value and a concentration of the hypochlorous acid should be measured in each lot number of semi-finished products; the pH value of hypochlorous acid should be pH 4 to 6.5, and the concentration of the hypochlorous acid should be 200 ppm or above. When the quality does not meet the requirements, it shall be treated as waste.

It should be noted that related processes must conform to laws and regulations.

The production process includes incoming materials inspection and acceptance, storage, amounting production quantity, and confirmation of the demand/weight of each raw material.

For the production operation program of the novel hypochlorous acid agent of the present invention, the key items are as follows:

They include raw materials drying operation (step A1), granular raw materials grinding operation (step A2), raw materials sieving and screening (step A3), weighing and sequentially mixing by machine (step A4), finished product inspection of hypochlorous acid (step A5), a qualified product of the hypochlorous acid (step A6), filling and loading the qualified product of the hypochlorous acid into an aluminum foil bag or a moisture-proof bag (step A7). Please refer to the flow chart in FIG. 3.

With reference to FIG. 3, the production method of the novel hypochlorous acid agent of the present invention is illustrated as follows:

In step A1, the raw materials are first placed and dried at a temperature of 40 to 50° C. for 4 to 5 hours. After drying, the moisture is measured, and the moisture content of each raw materials shall be 2% for conformity (i.e., the moisture≤2%);

In step A2, the raw materials containing particles is ground to meet the requirements for fine powder, so that the ingredients can be fully mixed;

In step A3, the raw materials after drying are sieved with a 50-80 mesh screen. During the sieving, the temperature of the production room shall be controlled at 18° C.~25° C. and the relative humidity at 20%~25% to prevent impurities and particles in the raw materials, so that raw material powders of the compound ratio can be fully mixed to achieve uniform requirements.

In step A4, according to the composition requirements, weigh the chlorine powder, calcium chloride, sodium dihydrogen phosphate or citric acid or ingredients or raw materials with acidic pH, and excipients in order, and then first put the chlorine powder and calcium chloride in a mixer for stirring, then add the sodium dihydrogen phosphate, or citric acid or ingredients or raw materials with acidic pH, and excipients, and after mixing well for 20 to 30 minutes, take out the finished product. Take sample from different mixing locations, and according to product standards of the company, determine whether the pH value of the finished product of the hypochlorous acid is 4 to 6.5 and whether the concentration of the hypochlorous acid reaches the product standard of 200 ppm.

In step A5, the finished product of the hypochlorous acid is tested, and if it is fails, it will be scrapped. Step A6 is to confirm the produced hypochlorous acid is acceptable. Step step A7 is to fill the hypochlorous acid agent into an aluminum foil bag or a moisture-proof bag.

Before production, it should be noted that: 1. The moisture of all raw materials should not exceed 2%; 2. the temperature is 15-25° C., and the relative humidity is 20-25%; 3. The raw materials are added in order, the chlorine powder and the sodium dihydrogen phosphate, or citric acid or ingredients or raw materials with acidic pH must not be directly stirred, and the chlorine powder and calcium chloride must be mixed first and then mixed with other components and stirred. The hypochlorous acid product of the present invention is produced, which is safe and efficient to use, and can be widely used as a disinfectant.

With reference to FIG. 4, the production method for the novel hypochlorous acid tablet of the present invention is as below:

Grind the acceptable hypochlorous acid agent (step A6) into a fine powder and mix it with and mixing the excipient (step B1) for testing the semi-finished product of the hypochlorous acid (step B2). Put the semi-finished product of the hypochlorous acid into the tableting press (step B3); make t hypochlorous acid talets (step B4); conduct hypochlorous acid tablet hardness test (step B5), and the hypochlorous acid tablet conformity test (step B6). Fill the aluminum foil bag with the hypochlorous acid tablets and seal it by the machine (step B7); loadi the hypochlorous acid tablets into finished boxes (step B8); load the boxes of the hypochlorous acid tablets into cartons (step B9); sum up the daily production quantity of the hypochlorous acid tablets and prepare a production report (step B10); ship the hypochlorite tablets (step B11). Please refer to the flow chart in FIG. 4.

In the step B1, grind the acceptable hypochlorous acid agent into the fine powder, and mixed with the excipient to be well and uniform, and determine the moisture content. The moisture content must be 1% or less to be accepted (i.e., the moisture content≤1%).

The acceptable semi-finished hypochlorous acid after being test in the step B2 is put into the tableting press in the step B3, to automatically conduct the tableting (i.e., step B4). During tableting, the moisture of the raw materials is ≤1%, the temperature is 15 to 25° C., and the humidity is 20 to 25%; in the step B5, the tablet is checked and weighed every 10 minutes to prevent the weight of the tablet from being incorrect. After confirming that the tablet is acceptable in the step B6, the hypochlorous acid tablets are packed into the aluminum foil bag and sealed in the step B7. The hypochlorous acid tablets are loaded into the finished box and marked with the lot number and expiration date in the step B8. In the step B9, the finished boxes of the hypochlorous acid tablets are loaded into the cartons and marked with the lot number. In the step B10, the field operator records the lot number of the finished product of the hypochlorous acid tablets daily. Finally, the shipping operation is performed according to the business unit order in the step B11.

In step B5, a hardness check is carried out; 10 pieces are sampled to confirm that the hardness meets the enterprise's quality and hardness standards is acceptable; if it is nonconforming, scrap the product.

In steps B7, B8 and B9, the acceptable semi-finished products are packed into the aluminum foil bag according to the requirements, and marked with the lot number with an automatic inkjet machine, and sealed with a film; every 5 bags are packed in a box, and put with a product manual, then marked with the lot number, production data and the expiration date, and sealed with a film; every 24 boxes are packed into a carton and marked with the lot number.

In step B10, before the finished products are packed into the warehouse, the quality control personnel will check the lot number, product specifications and other information of the packaged product one by one, and verify that they are correct before entering the warehouse.

Similarly, in step B6, samples for each batch of the finished product should be kept for future inspection; each batch of the finished product must be accompanied by a test report.

Before tableting, it should be noted that: 1. the moisture of all raw materials must not exceed 1%; 2. the temperature is 15-25° C., and the relative humidity is 20-25%.

The product of the present invention is produced and operated according to the present production process to produce the novel hypochlorous acid tablet product of the present invention, which is safe, efficient and widely used as a disinfectant tablet.

The novel hypochlorous acid agent (tablet) of the present invention has the functions of disinfection, sterilization, deodorization, water purification and bleaching, safe for people, and can be widely used in swimming pool disinfection, drinking water disinfection, food processing industry, beverage industry, industrial wastewater treatment, aquaculture, daily chemical industry, medical industry, schools, epidemic prevention, hotels, restaurants and large-scale sterilization after floods to prevent infection, and so on. With the the economic development, the living standard is increasing day by day, and the demand for disinfection and sterilization of evolving bacteria and viruses are increasing. The development of the novel hypochlorous acid agent (tablet) will gradually replace traditional chlorine-containing disinfectants, and it will be more widely used in daily sterilization needs, which will benefit national health and environmental well-being.

Where the foregoing is directed to the embodiments of the present invention, other or further embodiments of the present invention can be designed without violating its basic scope, and their basic scope is defined by the following claims. Although the present invention is explained in terms of related preferred embodiments, this does not constitute a limitation on the present invention. It should be noted that skilled persons in the field can construct many other similar embodiments based on the idea of the present invention, which are within the protection scope of the present invention.

What is claimed is:

1. A hypochlorous acid disinfectant powder consisting of:
   20 to 45 weight percent of dichloroisocyanuric acid, sodium salt or trichloroisocyanuric acid;
   15 to 40 weight percent of an organic acid or an inorganic acid;
   15 to 20 weight percent of calcium chloride; and
   5 to 12 weight percent of sodium carboxymethyl cellulose.

2. A production method for preparing the hypochlorous acid disinfectant powder of claim 1, comprising the steps of
mixing dichloroisocyanuric acid, sodium salt or trichloroisocyanuric acid with the inorganic acid or the organic acid, calcium chloride, 5 to 10 weight percent of sodium bicarbonate, and sodium carboxymethyl cellulose of 3 to 8%; and
after mixing making hypochlorous acid tablets by tableting.

3. A production method for preparing the hypochlorous acid disinfectant powder of claim 1, comprising the steps of:
providing dichloroisocyanuric acid, sodium salt or trichloroisocyanuric acid;
adding the inorganic acid or the organic acid, calcium chloride, sodium carboxymethyl cellulose, and 5 to 10 weight percent of sodium bicarbonate; and
putting the raw materials into a bag A and a bag B, and when in use, then separately adding the bag A and the bag B into water in order and mixing to generate hypochlorous acid solution,
wherein the bag A comprises dichloroisocyanuric acid, sodium salt or the trichloroisocyanuric and calcium chloride, and the bag B comprises the organic acid or the inorganic acid.

4. A production method for preparing the hypochlorous acid disinfectant powder of claim 1, comprising:
preparing a hypochlorous acid disinfectant power by mixing dichloroisocyanuric acid, sodium salt or the trichloroisocyanuric with calcium chloride, the organic acid or the inorganic acid, and adding 5 to 10 weight percent of sodium bicarbonate and sodium carboxymethyl cellulose; and
after the step of mixing, preparing the hypochlorous acid disinfectant powder, increasing or decreasing an amount of the hypochlorous acid disinfectant power according to a desired concentration of hypochlorous acid when preparing a solution of the hypochlorous acid disinfectant power in water.

5. A production method for preparing the hypochlorous acid disinfectant powder of claim 1, comprising:
step A1:
raw materials are first placed and dried at a temperature of 40 to 50° C. for 4 to 5 hours, after that drying, the moisture is measured, and the moisture content of each raw materials shall be 2% for conformity, the raw materials comprising:
dichloroisocyanuric acid sodium salt or trichloroisocyanuric acid, the organic acid or the inorganic acid, calcium chloride, and sodium carboxymethyl cellulose; and
step A2:
the raw materials are ground so that the raw materials are fully mixed;
step A3:
the raw materials after drying are sieved with a 50-80 mesh screen, and during the sieving the temperature of the production room shall be controlled at 18° C.-25° C. and the relative humidity at 20%-25% to prevent impurities and particles in the raw materials;
step A4:
according to composition requirements, weigh dichloroisocyanuric acid, sodium salt or trichloroisocyanuric acid, calcium chloride, the organic acid or the inorganic acid, and sodium carboxymethyl cellulose in order, and then firstly put dichloroisocyanuric acid, sodium salt or trichloroisocyanuric acid and calcium chloride in a mixer for stirring, then add the organic acid or the inorganic acid and sodium carboxymethyl cellulose, and after mixing well for 20 to 30 minutes, take samples from different mixing locations, and determine the pH value of the finished product of the hypochlorous acid disinfectant as 4 to 6.5 and the concentration of the hypochlorous acid must reach 200 ppm or higher;
step A5:
the finished product of the hypochlorous acid disinfectant is tested, and if it fails, it will be scrapped;
step A6:
confirm that the hypochlorous acid disinfectant is acceptable; and
step A7:
fill the hypochlorous acid disinfectant into an aluminum foil bag or a moisture-proof bag.

6. The production method according to claim 5, wherein in the step A1, the moisture of all the raw materials should not exceed 2%, the temperature is 15-25° C., and the relative humidity is 20-25%, and
the raw materials are added in order, and dichloroisocyanuric acid, sodium salt or trichloroisocyanuric acid and the organic acid or the inorganic acid are not directly stirred, and dichloroisocyanuric acid, sodium salt or trichloroisocyanuric acid and calcium chloride are mixed first and then mixed with other components and stirred.

7. The production method according to claim 5, wherein the production method of the disinfectant comprises:
step B1:
grind the hypochlorous acid disinfectant powder in the step A6 into a fine powder and mix with sodium carboxymethyl cellulose;
step B2:
test a semi-finished product of the hypochlorous acid;
step B3:
put the semi-finished product of the hypochlorous acid into a tableting press;
step B4:
make hypochlorous acid tablets with the tableting press;
step B5:
conduct a hypochlorous acid tablet hardness test;
step B6:
conduct a hypochlorous acid tablet conformity test;
step B7:
fill the aluminum foil bag with the hypochlorous acid tablets and seal it by a machine;
step B8:
load the hypochlorous acid tablets into finished boxes;
step B9:
load the boxes of the hypochlorous acid tablet into cartons;
step B10:
sum up a daily production quantity of the hypochlorous acid tablets and prepare a production report;
step B11:
ship the hypochlorite tablets, wherein
in the step B1, grind the hypochlorous acid disinfectant powder into the fine powder, and mix with sodium carboxymethyl cellulose to be well and uniform, and determine the moisture content, wherein the moisture content is 1% or less,
the semi-finished product of the hypochlorous acid after being test in the step B2 is put into the tableting press in the step B3, to automatically conduct the tableting in the step B4, wherein during tableting, the moisture of the raw materials is ≤1%, the temperature is 15 to 25° C., and the humidity is 20 to 25%, in the step B5, the tablet is checked and weighed every 10 minutes to prevent the weight of the tablet from being incorrect, after confirming that the tablet is acceptable in the step B6, the hypochlorous acid tablets are packed in the aluminum foil bag and sealed in the step B7, the hypochlorous acid tablets are loaded into the finished box and marked with a lot number and an expiration date in the step B8; in the step B9, the finished boxes of the hypochlorous acid tablets are loaded into the cartons and marked with the lot number, and in the step B10, the lot number of the finished product of the hypochlorous acid tablets are recorded daily.

8. The production method according to claim 7, wherein in the step B5, a hardness check is carried out, 10 pieces are sampled, in the step B6, samples for each lot of the finished product are kept for future inspection, and each batch of the finished product are accompanied by a test report.

9. The production method according to claim 7, wherein in the steps B7, B8 and B9, the finished products are packed into the aluminum foil bag and marked with the lot number with an automatic inkjet machine, and sealed with a film, every 5 bags are packed in a box, and put with a product manual, then marked with the lot number, production data and an expiration date, and sealed with a box film, every 24 boxes are packed into one box and marked with the lot number, and in the step B10, before the finished products are packed into a warehouse, the lot number, product specifications and other information of the finished products are checked one by one, and verified that they are correct before entering the warehouse.

10. The hypochlorous acid disinfectant powder of claim 1, wherein the inorganic acid is sodium dihydrogen phosphate or the organic acid is citric acid.

* * * * *